(12) United States Patent
Alexander (10) Patent No.: US 12,514,765 B2
(45) Date of Patent: Jan. 6, 2026

(54) WHEELCHAIR RESTRAINT SYSTEMS AND METHOD THEREOF

(71) Applicant: The Braun Corporation, Winamac, IN (US)

(72) Inventor: Michael Alexander, West Lafayette, IN (US)

(73) Assignee: The Braun Corporation, Winamac, IN (US)

( * ) Notice: Subject to any disclaimer, the term of this patent is extended or adjusted under 35 U.S.C. 154(b) by 382 days.

(21) Appl. No.: 18/190,103

(22) Filed: Mar. 26, 2023

(65) Prior Publication Data

US 2023/0301849 A1    Sep. 28, 2023

Related U.S. Application Data

(60) Provisional application No. 63/324,414, filed on Mar. 28, 2022.

(51) Int. Cl.
*A61G 3/00* (2006.01)
*A61G 3/08* (2006.01)

(52) U.S. Cl.
CPC ................ *A61G 3/0808* (2013.01)

(58) Field of Classification Search
CPC .................................................. A61G 3/0808
See application file for complete search history.

(56) References Cited

U.S. PATENT DOCUMENTS

| | | | |
|---|---|---|---|
| 4,093,303 A | 6/1978 | Nelson | |
| 8,763,186 B2 * | 7/2014 | Mosey | A61G 3/061 14/71.3 |
| 10,285,880 B1 * | 5/2019 | Ghannam | B60P 7/0892 |
| 11,123,241 B2 | 9/2021 | Mori | |
| 11,535,186 B2 * | 12/2022 | Jaradi | B60R 21/214 |

* cited by examiner

*Primary Examiner* — Steven O Douglas
(74) *Attorney, Agent, or Firm* — Daniel Tallitsch; Tyler Schultz (57) ABSTRACT

A wheelchair restraint system is provided for limiting movement of a wheelchair in a transport vehicle. The vehicle includes an interior, a floor and a side wall. A chock of the restraint system includes a body configured to be coupled to the floor or side wall in the interior of the vehicle. A coupling mechanism has a first end and a second end, wherein the first end is coupled to the chock and the second end is configured to couple the wheelchair to the chock.

24 Claims, 6 Drawing Sheets

WHEELCHAIR RESTRAINT SYSTEMS AND METHOD THEREOF

CROSS REFERENCE TO RELATED APPLICATIONS

This application claims priority to U.S. Provisional Patent Application No. 63/324,414, filed on Mar. 28, 2022, the contents of which is incorporated herein by reference.

FIELD OF THE DISCLOSURE

The present application relates to a passenger vehicle for transporting one or more passengers, and more particularly for releasably coupling a wheelchair to a restraint system in a vehicle.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van or bus is retrofitted with a ramp to enable a physically limited individual using a wheelchair to enter and exit the vehicle without the assistance of another individual.

Other known products for retrofitting a vehicle, such as a van, bus, sport-utility vehicle, or motor coach, include wheel chair lifts, lift platforms, ramps, securement systems, and lowered floor surfaces. In some instances, a floor of an original equipment manufacturer (OEM) vehicle is completely removed and replaced, lowered or otherwise modified to accommodate the entry and exit of the physically limited individual through a side door or entrance of the vehicle.

SUMMARY OF THE EMBODIMENTS

In a first embodiment of the present disclosure, a wheelchair restraint system includes a chock which is coupled to a vehicle and a coupling mechanism having a first end and a second end, wherein the first end of the coupling mechanism is coupled to the chock and the second end of the coupling mechanism is free to be coupled to a receiver mechanism for limiting movement of the wheelchair relative to the chock.

In one example of this embodiment, the wheelchair restraint system includes one or more receiver mechanisms located within the vehicle such that the second end of the coupling mechanism is configured to be removably coupled to the one or more receiver mechanisms.

In a second example, the wheelchair restraint system may include a sensing device. The sensing device may detect if a coupling mechanism is coupled to a receiver mechanism.

In a third example, the wheelchair restraint system includes a second chock spaced a predetermined distance from the first chock. A proximity sensor may transmit a notification or alert when a wheel is within a target proximity or predefined distance of the first and second chocks. In another example, the first end of one coupling mechanism may be coupled to the first or second chock. In still another example, the receiver mechanism is coupled to the first or second chock. Alternatively, the receiver mechanism may be coupled to the floor, side wall or ceiling in the cab of the vehicle.

In a further example of this embodiment, the wheelchair restraint system may be configured to restrain a wheelchair by at least partially wrapping one or more coupling mechanisms at least partially around a frame of the wheelchair and coupling the second end of the one or more coupling mechanisms to the receiver mechanism.

In another embodiment of the present disclosure, a method is provided for restraining a wheelchair in a cab of a vehicle, where the cab is defined by a floor, a roof and a wall of the vehicle. The method includes providing a restraint system having at least a chock, a coupling mechanism, and a receiver mechanism, coupling the chock to the floor of the vehicle, receiving a wheel of the wheelchair within an interior cavity of the chock, positioning the coupling mechanism around the wheel or a frame of the wheelchair, and connecting an end of the coupling mechanism to the receiver mechanism to limit movement of the wheelchair relative to the chock.

In one example of this embodiment, the coupling the chock step includes adjustably coupling the chock to a track system coupled to the floor of the vehicle. In a second example, the method includes sensing via a sensing device when the coupling mechanism is connected to the receiver mechanism. In another example, the method includes coupling a second chock to the floor of the vehicle, spacing the second chock from the first chock, and receiving a second wheel of the wheelchair in an interior cavity of the second chock.

In a further example of this embodiment, the method includes providing a second coupling mechanism and a second receiver mechanism, positioning the second coupling mechanism around the second wheel or the frame of the wheelchair, and coupling an end of the second coupling mechanism to the second receiver mechanism. In another example, the method includes sensing via a sensing device when the first coupling mechanism is coupled to the first receiver mechanism or the second coupling mechanism is coupled to the second receiver mechanism. In yet another example, the method includes detecting via a sensing device when the wheel of the wheelchair is within a predefined distance of the chock, and transmitting a signal upon detecting the wheel is within the predefined distance of the chock.

In a further embodiment of the present disclosure, a vehicle includes an interior cab, a vehicle floor located in the cab, a track system having at least one track coupled to the floor, and a wheelchair restraint system including a chock, a coupling mechanism, and a receiver mechanism, the chock being adjustably coupled to the at least one track. The chock includes a body defining an interior cavity configured to receive a wheel of a wheelchair, and an end of the coupling mechanism is configured to be positioned around the wheel or a frame of the wheelchair and couple to the receiver mechanism to limit movement of a wheelchair relative to the chock.

In one example of this embodiment, the receiver mechanism is coupled to the chock, the vehicle floor or to another location in the cab. In a second example, the wheelchair restraint system may include a second chock, a second coupling mechanism, and a second receiver mechanism. The second chock may be spaced from the first chock, and the second chock includes a body having an interior cavity configured to receive a second wheel of the wheelchair. In a third example, a sensor may be located in the cab of the vehicle and is configured to detect when the end of the coupling mechanism is coupled to the receiver mechanism.

In another example, the chock has a first portion and a second portion, the first portion being integrally formed with and disposed at an angle relative to the first portion. In a further example, the first portion is adjustably coupled to the at least one track. In yet another example, the interior cavity of the first portion and second portion has a defined width, the width being sized to receive the wheel of the wheelchair such that at least the first portion or second portion is configured to be in contact with the wheel. In yet a further example, when the coupling mechanism is coupled to the receiver mechanism, the coupling mechanism biases the wheel into contact with the first portion or second portion of the chock.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION OF THE EMBODIMENTS

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
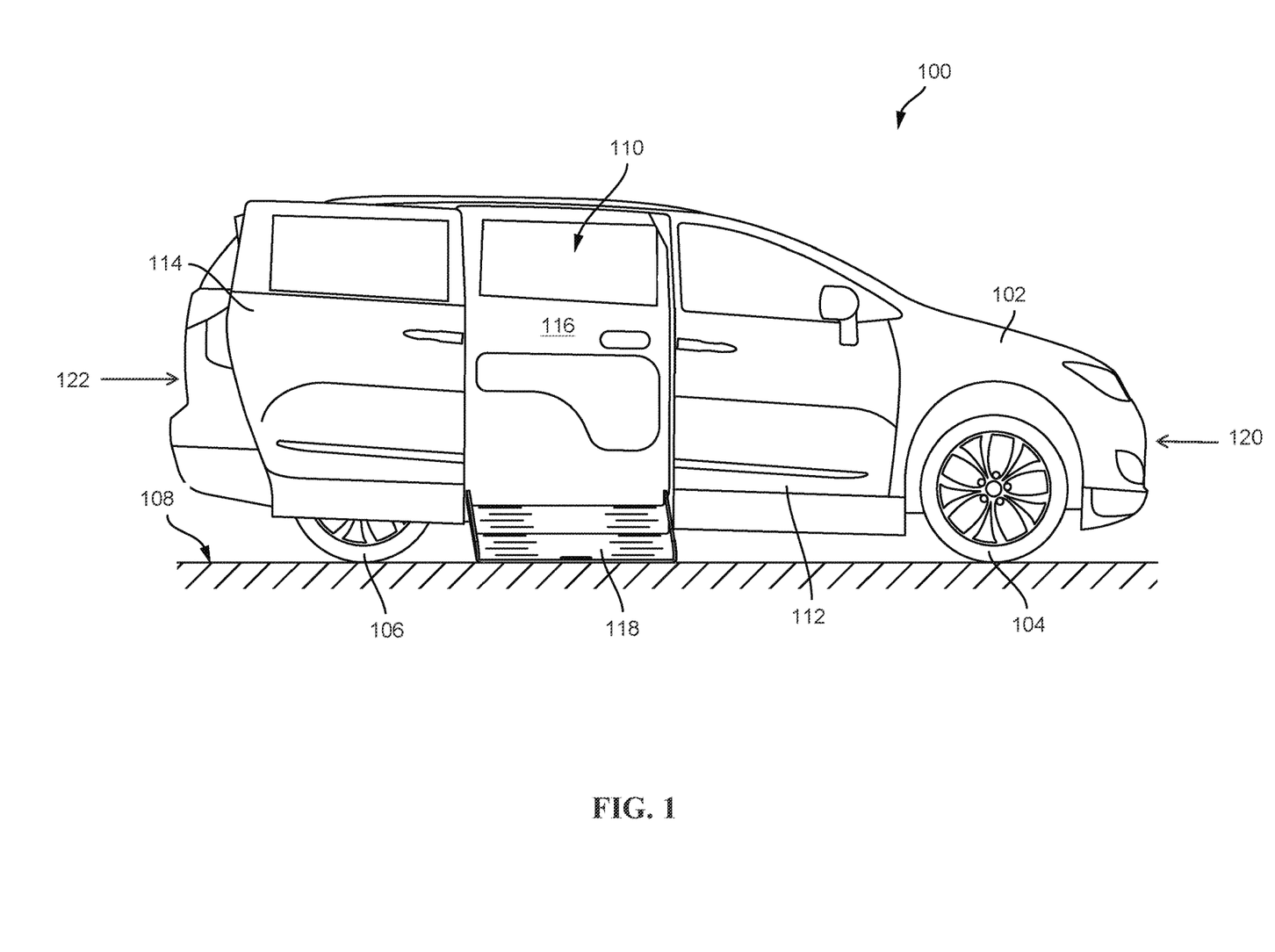
FIG. 1 is a side view of a vehicle.

FIG. 1 illustrates a vehicle 100, commonly identified as a sport-utility vehicle available from any number of United States and foreign manufacturers. The vehicle 100 may be a passenger vehicle, personal vehicle, transportation bus, tour bus, a double-decker bus, or any other type of vehicle. The principles and teachings of the present disclosure may be used for any type of vehicle.

In the illustrated embodiment of FIG. 1, the vehicle 100 includes a unibody construction, but other vehicles having a frame on body construction, are also included in the present disclosure. Consequently, the use of vehicle 100 herein includes all types and kinds of vehicles with a body on frame construction, a unibody construction, or other constructions. In addition, while the sport-utility vehicle 100 is illustrated in FIG. 1, the present disclosure is directed to all passenger vehicles carrying one or more passengers including, but not limited to, a bus, motor coach, sport-utility vehicle, truck, taxi, ambulance, or passenger car.

The vehicle 100 includes a frame or chassis 102 operatively coupled to front wheels 104 and rear wheels 106 that move the vehicle 100 along a ground surface 108. In one embodiment the vehicle 100 may be any vehicle suitable for use with or adaptable to be used with a ramp assembly 118. However, the vehicle 100 may be any vehicle 100, whether or not the vehicle 100 is suitable for use with or adaptable to be used with the ramp assembly 118. A first passenger door 112 may be located between the front wheels 104 and the rear wheels 106. A first passenger opening 110 may be located between the front wheels 104 and the rear wheels 106, located closer to the rear end of a vehicle 122 relative to the first passenger side door 112. The first passenger opening 110 may provide access to the vehicle 100 for a passenger. A second passenger door 114 may be coupled to the vehicle 100 and may substantially cover the first passenger opening 110. The passenger opening 110 may be modified to increase the size of the opening 110 to provide access, for example, to a passenger seated in a wheelchair to enter and exit the vehicle 100. The vehicle 100 may include a floor (not pictured) extending throughout the vehicle 100 to support passengers and other objects traveling in the vehicle 100. The floor of the vehicle 100 may be a conventional floor or it may be a modified floor to accommodate the ramp assembly 118.

As shown in FIG. 1, the vehicle 100 may be further modified to include the ramp assembly 118 which provides rolling access of a wheelchair from the ground surface 108 into an interior 116 of the vehicle 100. In one embodiment, the vehicle 100 may contain a wheelchair lift, which may assist a wheelchair user 202 with entering and exiting the vehicle 100. In another embodiment, the ramp may be a telescopic ramp. In another embodiment, the ramp may be a foldable ramp.

In some embodiments, the middle row of the seats in the vehicle 100 may be removed from the vehicle 100 to enable a passenger seated in a wheelchair to enter and exit the vehicle 100 on the ramp assemble 118. In another embodiment, the vehicle 100 may be produced to accommodate wheelchair users 202 (see FIG. 2) to enter and exit the vehicle 100, such as in a bus, or any other type of vehicle.

Figure 2:
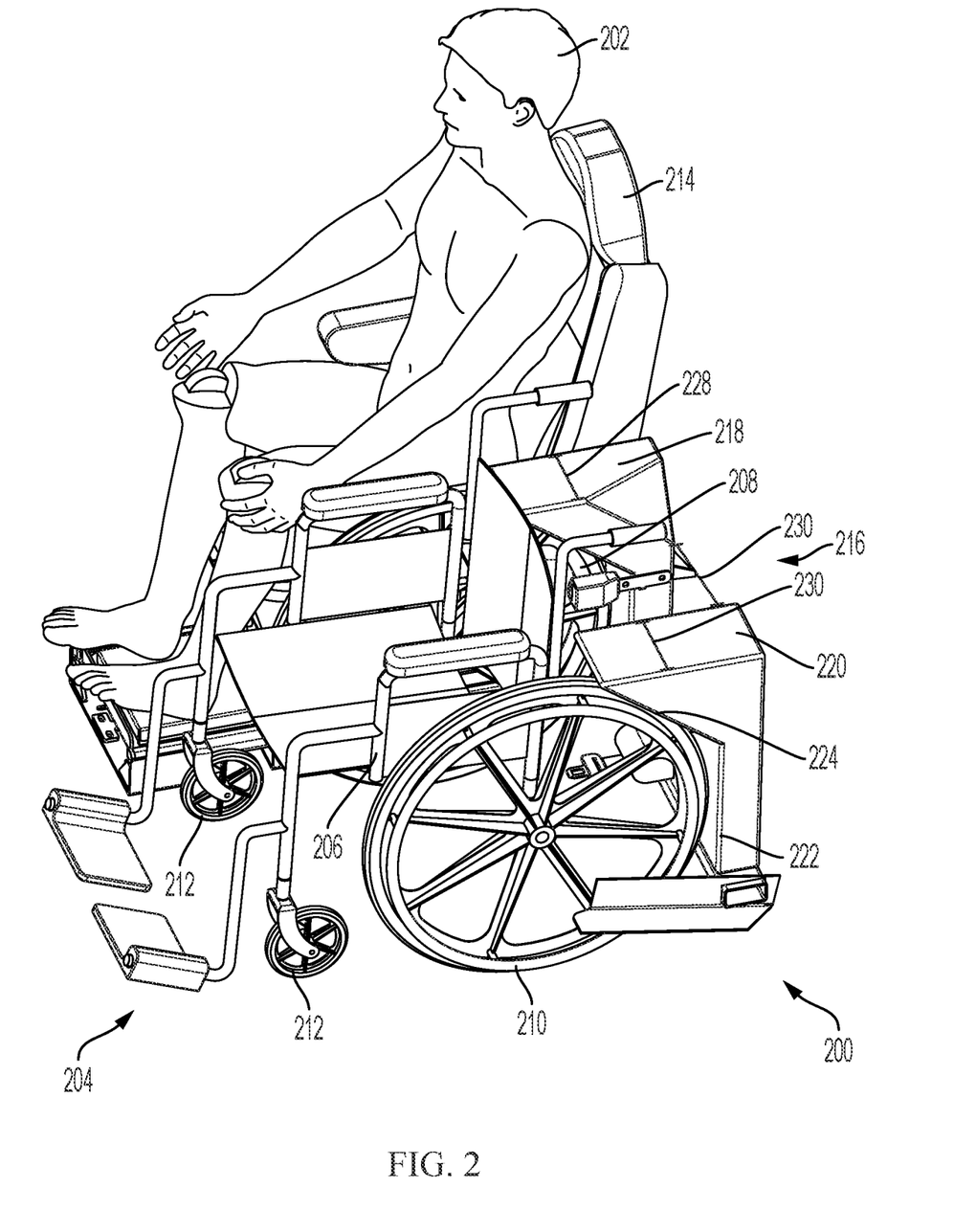
FIG. 2 is a front perspective view of a wheelchair restraint system.

Referring to FIG. 2 of the present disclosure, the wheelchair user 202 is illustrated in a passenger seat 214. A wheelchair 204 may be secured with a wheelchair restraint system 200, as illustrated. The wheelchair 204 may include a frame 206 supported by a first rear wheel 208, a second rear wheel 210, and one or more front wheels 212. A wheelchair brake (not shown) may be located at one or more wheels 208, 210, 212, for slowing down or preventing the wheels 208, 210, 212 from rotating. The wheelchair 204 may be a powered wheelchair or a manually powered wheelchair. Any type of wheelchair 204 may be applicable to the present disclosure.

In FIG. 2, the wheelchair 202 may be moveably positioned in the interior 116 of the vehicle 100 which has a vehicle floor and one or more passenger seats 214. The floor may be the original OEM vehicle floor, or it may be a modified vehicle floor to accommodate the ramp assembly 118 or a wheelchair lift assembly. The one or more passenger seats 214 and the wheelchair restraint system 200 may be facing a front end 120 of the vehicle 100, the rear 122 end of the vehicle 100, or any position therebetween.

Figure 3:
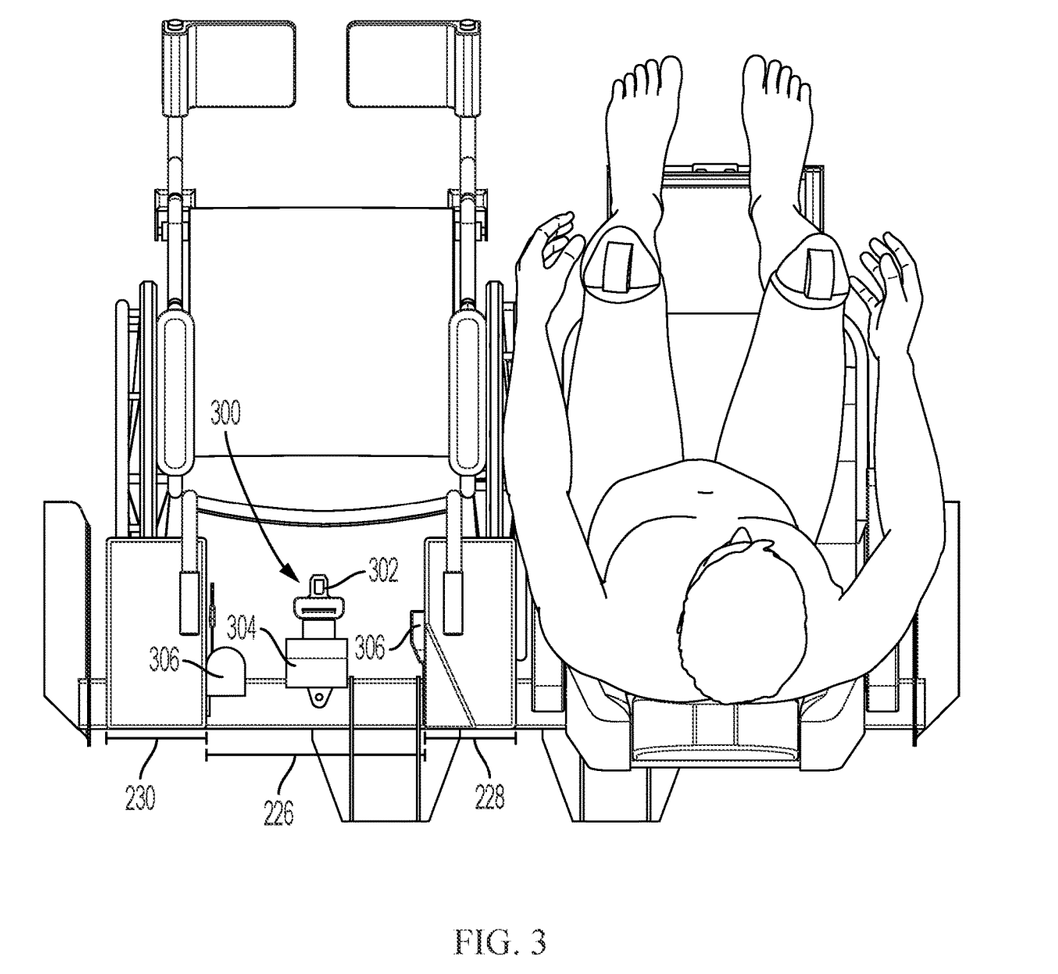
FIG. 3 is a top view of the of the wheelchair restraint system.

The wheelchair restraint system 200 may be located in the interior 116 of the vehicle 100. In one embodiment, the wheelchair restraint system 200 may be adjacent to the passenger seat 214. As illustrated in FIGS. 2 and 3, the wheelchair restraint system 200 may comprise one or more chocks 216, a coupling mechanism 300 (see FIG. 3), and a belt receiver 306 (see FIG. 3). In one embodiment the one or more chocks 216 may include a first chock 218 and a second chock 220.

In one embodiment, the first and second chocks 218, 220, may be located within the vehicle 100 and may be coupled to either the vehicle floor or to a track system installed in the vehicle 100. The track system is described more fully below. The chocks 218, 220 may be mounted and extend from the vehicle floor and have, among other aspects, a first interior portion 222 and a second interior portion 224. The first interior portion 222 may extend upwardly in a general direction from the vehicle floor, whereas the second interior portion 224 may be at an angle relative to the first interior portion 222. The angle between the second interior portion 224 may be at least 90 degrees but less than 180 degrees relative to the first interior portion 222. In another embodiment, the angle between the second interior portion 224 relative to the first interior portion 222 may be at least 95 degrees, but less than 180 degrees. In another embodiment, the angle between the second interior portion 224 relative to the first interior portion 222 may be at least 100 degrees, but less than 180 degrees. In another embodiment, the angle between the second interior portion 224 relative to the first interior portion 222 may be at least 110 degrees, but less than 180 degrees. In another embodiment, the angle between the second interior portion 224 relative to the first interior portion 222 may be at least 120 degrees, but less than 180 degrees. In another embodiment, the angle between the second interior portion 224 relative to the first interior portion 222 may be at least 130 degrees, but less than 180 degrees. In another embodiment, the angle between the second interior portion 224 relative to the first interior portion 222 may be at least 140 degrees, but less than 180 degrees. In another embodiment, the angle between the second interior portion 224 relative to the first interior portion 222 may be at least 150 degrees, but less than 180 degrees. In another embodiment, the angle between the second interior portion 224 relative to the first interior portion 222 may be at least 160 degrees, but less than 180 degrees. In another embodiment, the angle between the second interior portion 224 relative to the first interior portion 222 may be at least 170 degrees, but less than 180 degrees.

In another embodiment, the one or more chocks 216 may have a first interior portion 222 extending from the vehicle 100 floor in a configuration that may be substantially vertical relative to the floor of the vehicle 100. In this embodiment, the one or more chocks 216 may also include a second interior portion 224 that extends from the floor of the vehicle 100 in a configuration that may be at least a partially curved. In another embodiment, the one or more chocks 216 may only have one interior portion (not pictured). In this embodiment, the interior portion may extend from the floor and have an at least partially curved configuration.

In the present disclosure the first and second chocks 218, 220 may be spaced apart by a distance 226. In one example, the distance 226 between the first and second chocks 218, 220 may be about 8 inches. In another embodiment, the distance 226 may be less than 20 inches. In another embodiment, the distance 226 may be less than 15 inches. In another embodiment, the distance 226 may be less than 10 inches. In another embodiment, the distance 226 may be less than 8 inches. In one embodiment, the chocks 218, 220 may be moveable between one or more secured positions. In this embodiment, the distance 226 may change when one or more chocks 218, 220 are moved. The distance 226 between the chocks 218, 220 may be advantageously designed for the user 202 to store a bag, backpack, or other personal item on the rear of the wheelchair 204, or it may allow the user to position a wheelchair with a power assist device without interfering with restraining the wheelchair 204. Therefore the user 202 may position the wheelchair 204 into the restraint system 200 with an attachment on the rear of the wheelchair 204 and couple the wheelchair 202 to the restraint system 200 without removing the attachment.

Additionally, the first chock 218 may have a first width 228 and the second chock 220 may have a second width 230. The widths of the first and second chock 228, 230 may be about 6 to 8 inches. In one embodiment the widths of the first and second chock 228, 230 may be substantially similar. In another embodiment, the width of the first chock 228 may be larger than the width of the second chock 230. In another embodiment, the width of the first chock 228 may be smaller than the width of the second chock 230. In one example the width of the first chock 228 may be less than 15 inches. In another example the width of the first chock 228 may be less than 10 inches. In another example the width of the first chock 228 may be less than 8 inches. In another example the width of the first chock 228 may be less than 6 inches. In one example the width of the second chock 230 may be less than 20 inches. In another example the width of the second chock 230 may be less than 15 inches. In another example the width of the second chock 230 may be less than 10 inches. In another example the width of the second chock 230 may be less than 8 inches. In another example the width of the second chock 230 may be less than 6 inches. In another embodiment, the one or more chocks 216 may comprise only one chock (not pictured). In one example the width of the single chock may be less than 40 inches. In another example the width of the single chock may be less than 30 inches. In another example the width of the single chock may be less than 20 inches. In another example the width of the single chock may be less than 15 inches. In another example the width of the single chock may be less than 10 inches.

In one embodiment, the combination of the distance 226 between the first and second chocks 218, 220, along with the first and second widths 228, 230 of the chocks 218, 220 may accommodate a plurality of different wheelchair 204 widths and configurations. In one embodiment, the wheelchair restraint system 200 may not have obstacles, structures, or objects underneath the wheelchair 204 when the wheelchair 204 is secured thereto. This enables the wheelchair 204 to have an electric drive assist, which may be generally located between the front wheels 212 and rear wheels 210 of the wheelchair 204. Having a wheelchair restraint system 200 without any obstacles, structures, or objects underneath the wheelchair 204 when the wheelchair 204 is secured enables the user 202 to advantageously secure the wheelchair 204 with an electric drive assist. In another embodiment, the wheelchair restraint system 200 may have some obstacles, structures, or objects underneath the wheelchair 204 when the wheelchair 204 is secured. In some embodiments, there may be an obstacle, structure, or object located between the first and second chocks 218, 220.

In FIG. 3, the wheelchair restraint system 200 may include the coupling mechanism 300. The belt 300 may have a first end 302 and a second end 304. The first end 302 may be designed to secure the wheelchair 204 by coupling to the wheelchair 204, to a location on the vehicle 100, or to the belt receiver 306. The second end of the coupling mechanism 304 may be coupled to the vehicle 100, to the first chock 218, or to the second chock 220. In one embodiment, the coupling mechanism 300 may wrap around a portion of the wheelchair frame 206 and then may couple to the belt receiver 306. In another embodiment, the coupling mechanism 300 may wrap around a portion of the wheelchair frame 206 and couple to the wheelchair 204. In this embodiment, the coupling mechanism 300 may couple to the wheelchair 204 by tying the belt 300 to a portion of the wheelchair 204 with a clip or in any other manner known in the art.

In one embodiment, the wheelchair 204 may be positioned such that the wheelchair user 202 positions the wheelchair 204 within the wheelchair restraint system 200. In one embodiment, the wheelchair restraint system may include one or more chocks 216. The user 202 may engage the wheelchair lock (not pictured) to prevent one or more wheels from rotating. Once locked, the user 202 may exit the wheelchair 204 and move to the passenger seat 214 located in the vehicle. The user 202 may sit in the passenger seat 214 located in the vehicle. The wheelchair 204 may then be secured with the coupling mechanism 300 as shown in FIG. 3. The securement of the wheelchair 204 may be accomplished by the wheelchair user 202 or another individual, but without requiring assistance from a second individual.

In one embodiment, the wheelchair user 202 may position the wheelchair 204 within the wheelchair restraint system 200 such that the first rear wheel 208 may contact the first chock 218 at a location within the first and second interior portions 222, 224 and the second rear wheel 210 may contact the second chock 220 at a location within the first and second interior portions 222, 224. In another embodiment, when the user 202 positions the wheelchair 204 within the wheelchair restraint system 200, the first rear wheel 208 may contact the first chock 218 at one location, and the second rear wheel 210 may contact the second chock 220 at one location. In another embodiment, when the user 202 positions the wheelchair 204 within the wheelchair restraint system 200, the first rear wheel 208 may not contact the first chock 218 and the second rear wheel 210 may contact the second chock 220 at one or more locations. In another embodiment, when the user 202 positions the wheelchair 204 within the wheelchair restraint system 200, the first rear wheel 208 may contact the first chock 218 at one or more locations, and the second rear wheel 210 may not contact the second chock 220. In a further embodiment, the wheelchair 204 rear wheels 208, 210 may not contact either chock 218, 220.

In another embodiment, there may be only one chock. In this embodiment, the first rear wheel 208 may contact the chock in two locations and the second rear wheel 210 may contact the chock in two locations. In another embodiment, the first rear wheel 208 may contact the chock in one or more locations and the second rear wheel 210 may not come into contact with the chock. In yet another embodiment, the first rear wheel 208 may not contact the chock while the second rear wheel 210 may contact the chock in one or more locations. In a further embodiment, the first rear wheel 208 may contact the chock in one or more locations and the second rear wheel 210 may contact the chock in one or more locations.

In another embodiment, the wheelchair may transition between the embodiments described above. In one embodiment, the wheelchair 204 may be fastened in the wheelchair restraint system 200 with the first rear wheel 208 in contact at one or more locations of the first chock 218 and the second rear wheel 210 in contact at one or more locations of the second chock 220. In one example, the wheelchair 204 may move enabling the first rear wheel 208 to not contact the first chock 218, while the second rear wheel 210 remains in contact with the second chock 220 at one or more locations. In another example, the wheelchair 204 may move enabling the second rear wheel 210 to not contact the second chock 220, while the first rear wheel 208 remains in contact with the first chock 218 at one or more locations. In another example, the wheelchair 204 may move enabling both the first and second rear wheels 208, 210 to not be in contact with the chocks 218, 220.

In another embodiment, the wheelchair 204 may be fastened in the wheelchair restraint system 200 with the first rear wheel 208 in contact with at least one location of the first chock 218 and the second rear wheel 210 in contact with at least one location of the second chock 220. In one example, the wheelchair 204 may move enabling the first rear wheel 208 to not contact the first chock 218, while the second rear wheel 210 remains in contact with the second chock 220 with at least one location. In another example, the wheelchair 204 may move enabling the second rear wheel 210 to not contact the second chock 220, while the first rear wheel 208 remains in contact with the first chock 218 with at least one location. In another example, the wheelchair 204 may move enabling both the first and second rear wheels 208, 210 to not be in contact with the chocks 218, 220.

In another embodiment, the wheelchair 204 may be fastened in the wheelchair restraint system 200 with the first rear wheel 208 not in contact with the first chock 218 and the second rear wheel 210 not in contact with the second chock 220. In one example, the wheelchair 204 may move enabling the first rear wheel 208 to contact the first chock 218 at one or more locations, while the second rear wheel 210 remains not in contact with the second chock 220. In another example, the wheelchair 204 may move enabling the second rear wheel 210 contact the second chock 220 at one or more locations, while the first rear wheel 208 remains not in contact with the first chock 218. In another embodiment, the wheelchair 204 may move enabling the first rear wheel 208 to contact the first chock 218 at one or more locations and the second rear wheel 210 to contact the second chock 220 at one or more locations.

In the present disclosure, the first and second chocks 218, 220 may be located adjacent to the passenger seat 214. This location enables the wheelchair user 202 to exit the wheelchair 204 and transfer to the passenger seat 214. The securement of the wheelchair 204 may occur once the user 202 has transferred to the passenger seat 214 or while the user 202 is in the wheelchair 204. In the illustrative embodiment of FIG. 2, a wheelchair restraint system 200 with the wheelchair 204 facing the same direction as the passenger seat 214 is illustrated. In one embodiment, both the wheelchair 204 and the passenger seat 214 may be facing the front end of the vehicle 120. In another embodiment, both the wheelchair 204 and the passenger seat 214 may be facing the rear end of the vehicle 122. In still another embodiment, the wheelchair 204 and the passenger seat 214 may both be facing any direction or at any angle relative to the front end 120 and rear end 122 of the vehicle 100. In another embodiment the restraint system 200 may be configured so the wheelchair 204 is facing a different direction as the passenger seat 214. In one embodiment, the wheelchair 204 may be facing the rear end of the vehicle 122 and the passenger seat 214 may be facing the front end of the vehicle 120. In another embodiment, the wheelchair may be facing the front end of the vehicle 120 and the passenger seat 214 may be facing the rear end of the vehicle 122. In still another embodiment, the passenger seat 214 and wheelchair 204 may face any direction or at any angle therebetween, wherein the wheelchair 204 is not facing the same direction as the passenger seat 214. Additionally, the wheelchair restraint system may not be adjacent to the passenger seat 214, in which case the wheelchair user 202 may be transported by standing in a public transportation vehicle.

Figure 4:
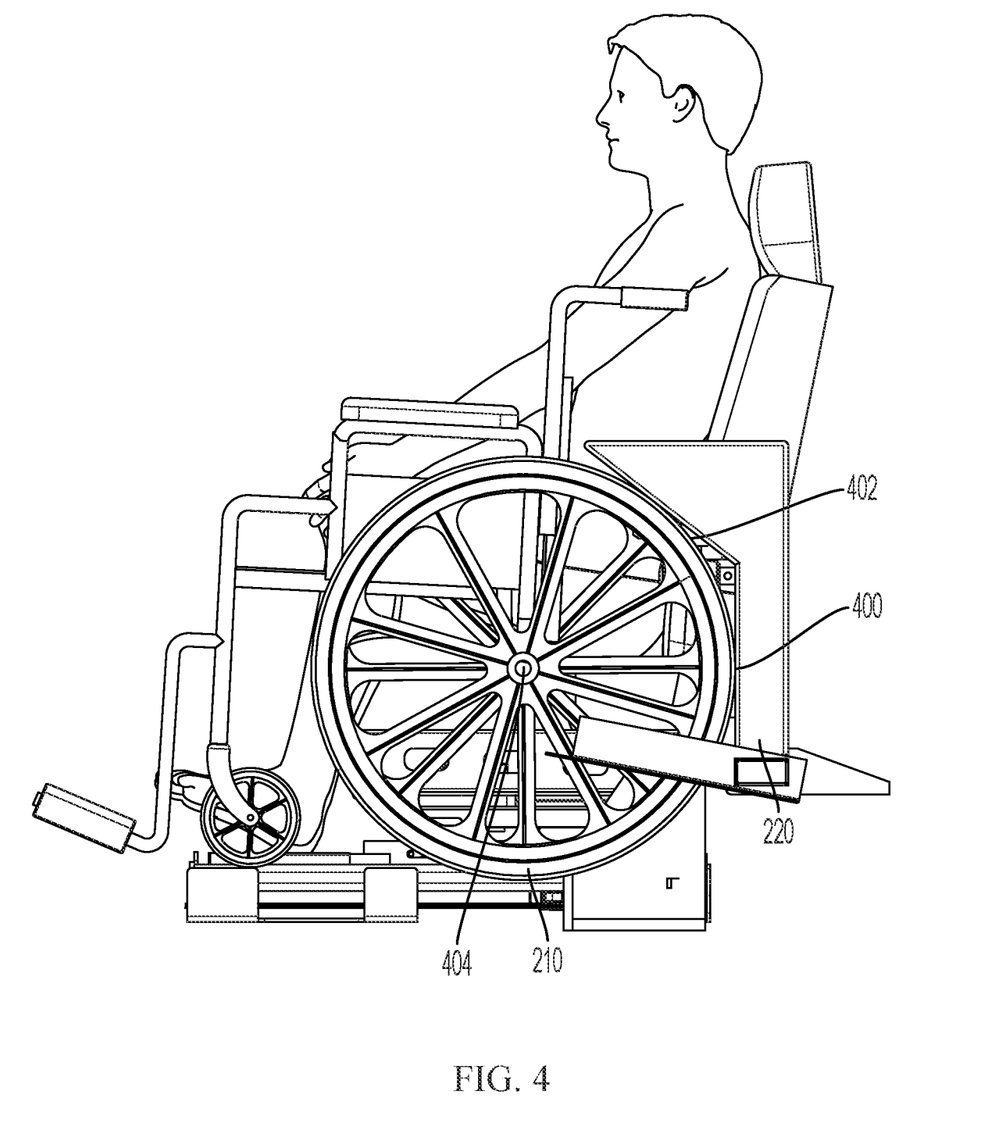
FIG. 4 is a side view of the wheelchair restraint system.

FIG. 4 illustrates the wheelchair 204 positioned into proximity with the wheelchair restraint system 200, where the second rear wheel 210 is in contact with the second chock 220 at two locations. In this embodiment, the second rear wheel 210 may contact the second chock 220 at a first location 400 and at a second location 402. More specifically, FIG. 4 illustrates that the second rear wheel 210 may contact the first interior portion 222 of the second chock 220 at the first location 400 and the interior portion 224 thereof at the second location 402.

In one embodiment, the first location 400 of contact between the rear wheels 208, 210 of the wheelchair 204 and the chocks 218, 220 may occur at a rear portion of the wheel 208, 210, at about the height of a rotation axle 404 of the wheel 210. In another embodiment, the first location 400 of contact may occur at a rear portion of the wheels 208, 210 that is above the height of the axle 404 of the wheel 210. In yet another embodiment, the first location 400 of contact may occur at a rear portion of the wheels 208, 210 that is below the height of the axle 404 of the wheel 210. Moreover, the second location 402 of contact between the rear wheel 208, 210 and the chock 218, 220 may be at a height above the first location 400 of contact.

Figure 6:
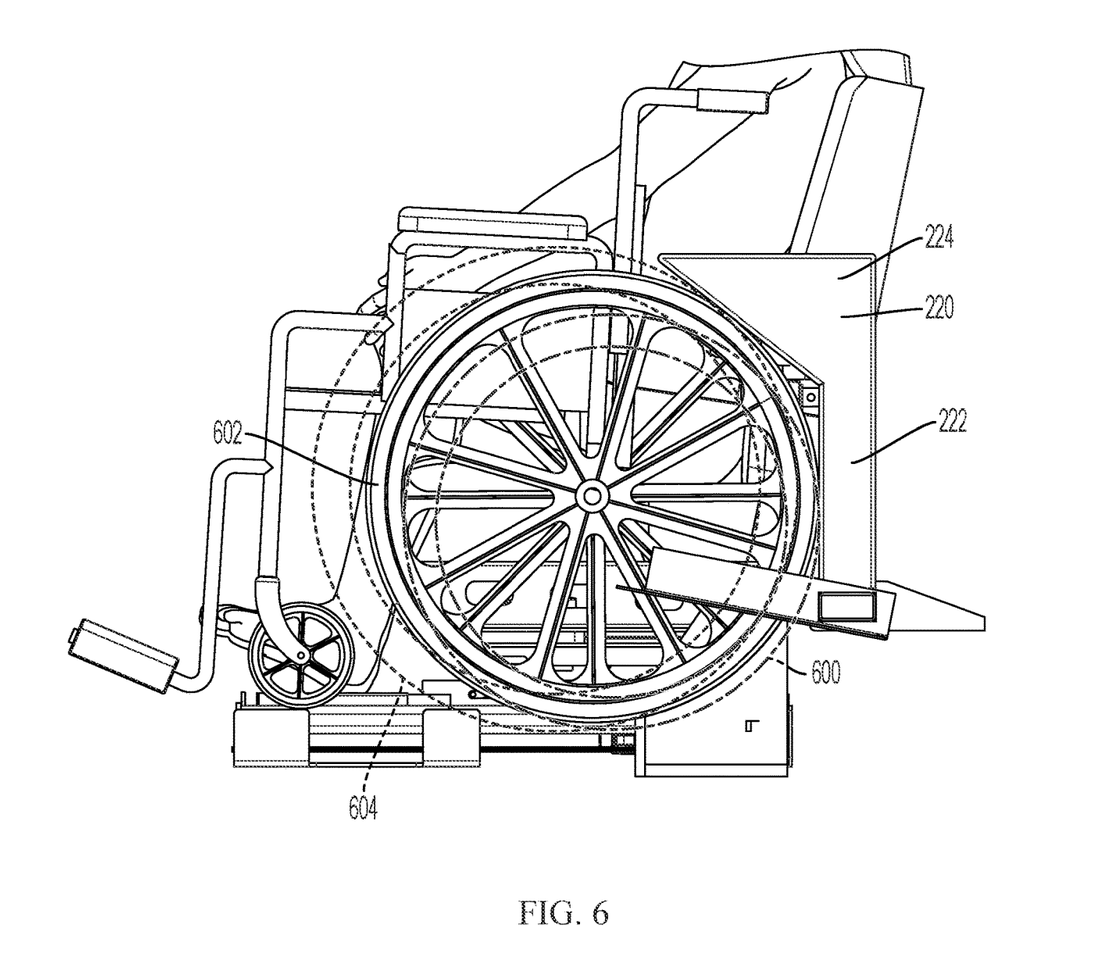
FIG. 6 an enlarged side view of the wheelchair restraint system.

Referring now to FIG. 6, in one embodiment the angle of the second interior portion 224 of the first and second chocks 218, 220, may accommodate different rear wheel 208, 210 diameters. In one embodiment, the wheelchair 204 with rear wheels 208, 210 may have a first diameter 600, a second diameter 602 which is larger relative to the first diameter 600, and the third diameter 604 which is larger relative to the second diameter 602. In one embodiment, the wheelchair 204 may have rear wheels 208, 210 with the third diameter 604. These rear wheels 208, 210 may contact the second interior portion 224 of the chocks 218, 220, at a point that is farther from the floor of the vehicle 100 than a wheelchair 204 with rear wheels 208, 210 having the first diameter 600. In other words, in this embodiment, the wheels 208, 210 of a wheelchair 204 having the first diameter 600 may contact the second interior portion at a location that is closer to the vehicle floor than wheels 208, 210 of a wheelchair 204 having the third diameter 604.

In one example, the rear wheels 208, 210, of the wheelchair 204 may not contact the chocks 218, 220 at all. In this example, the user may not have backed the wheelchair 204 completely under the wheelchair restraint system 200 before engaging the wheelchair wheel lock and securing the coupling mechanism 300. In this example, the wheelchair 204 may still be secured by the wheelchair lock and by the coupling mechanism 300. In yet another example, the wheelchair 204 may not have a wheelchair lock that engages. In this example, after the user 202 secures the wheelchair 204 to the wheelchair restraint system 200 using the coupling mechanism 300, the wheelchair's rear wheels 208, 210 may roll in to and out of contact with one or more of the chocks 218, 220.

Figure 5:
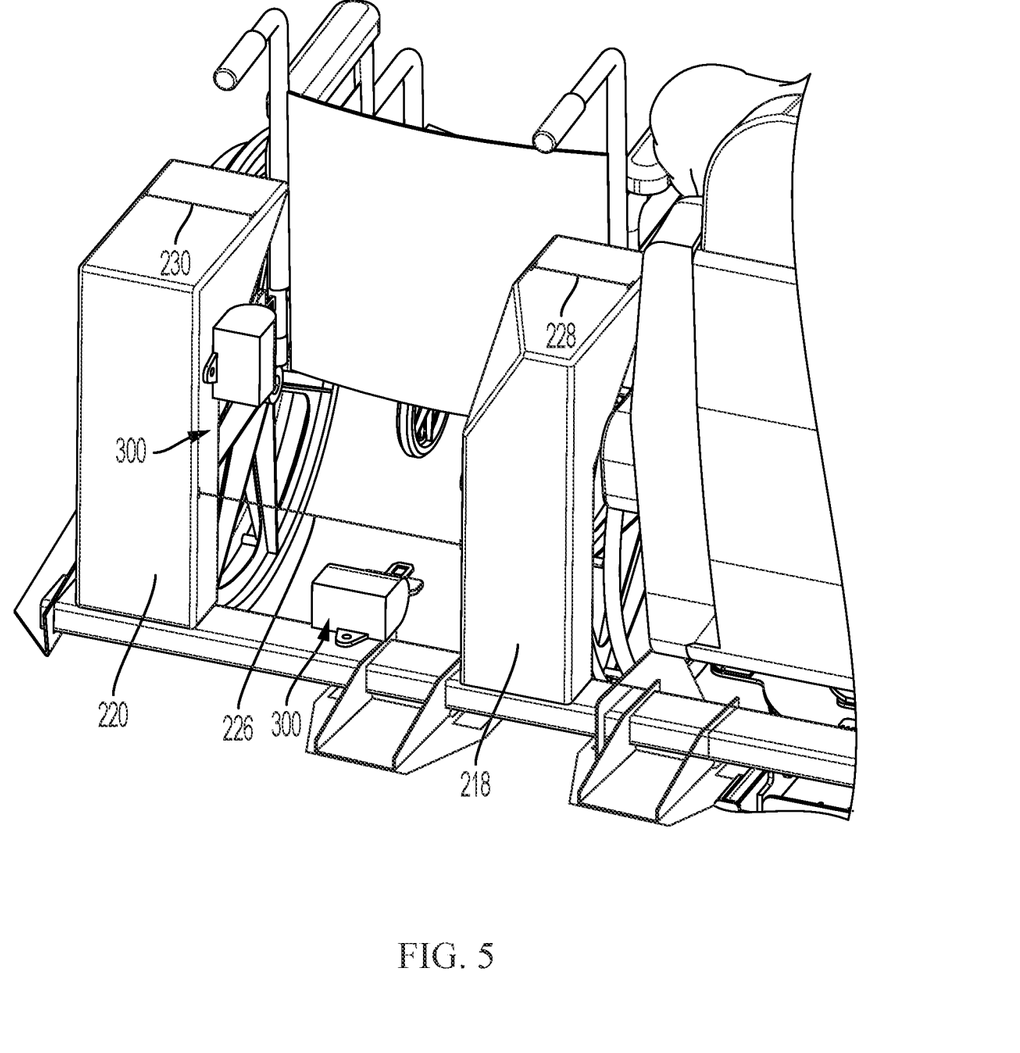
FIG. 5 is a rear perspective view of the wheelchair restraint system.

FIG. 5 illustrates alternative locations where the second end of the coupling mechanism 304 may be secured. In one embodiment, the second end of the coupling mechanism 304 may be secured approximately between the first and second chocks 218, 220. In another embodiment, the second end of the coupling mechanism 304 may be secured on either the first or second chock 218, 220. In still another embodiment, there may be additional coupling mechanisms 300. In this embodiment, the one or more coupling mechanisms 300 may be secured to the first chock 218, the second chock 220, in a location partially between the first and second chocks 218, 220, to the vehicle 100 floor, to a track system in the vehicle 100, to an interior sidewall of the vehicle 100, and/or coupled to an interior vehicle 100 ceiling. It should be appreciated that any number of coupling mechanisms 300 may be used, and the coupling mechanisms 300 may be located anywhere inside the vehicle 100.

Likewise, there may be one or more belt receivers 306. The belt receivers 306 may be designed to releasably couple the coupling mechanisms 300. In one embodiment, the coupling mechanism 300 may be at least partially wrapped around part of the wheelchair frame 206, and then the first end of the coupling mechanism 302 may be coupled to the coupling mechanism receiver 306. The coupling mechanism 300 may be at least partially wrapped around part of the wheelchair frame 206 or around the rear wheel 208, 210 so that in the event of a sudden stop, crash, turn, acceleration, or deceleration the wheelchair 204 will remain secured. In one embodiment the coupling mechanism receiver 306 may be a latching mechanism similar to a seat belt receiver. While the coupling mechanism receiver 306 similar to a seatbelt receiver is disclosed, it should be appreciated that any manner known in the art of securing the first end of the coupling mechanism 302 to the coupling mechanism receiver 306 may be used.

In another embodiment the first end of the coupling mechanism 302 may be a hook or clasp, and the receiver 306 may be a recess, or loop to receive the hook. In another embodiment, the first end of the coupling mechanism 302 and the receiver 306 may comprise of hook and loop fasteners, such as Velcro. In still another embodiment, the first end of the coupling mechanism 302 may be a belt or strap with holes in the belt or strap, and the receiver 306 may be a buckle with a frame and a hinged pin located therein, wherein the hinged pin rotates into a hole in the belt or strap thereby securing it. In another embodiment, the first end of the coupling mechanism 302 may be a belt or strap, and the receiver 306 may be a cinched buckle. In another embodiment, the first end of the coupling mechanism 302 may be a side release male member with two spring prongs on either side of the member, and the receiver 306 may be an insertion end with two side holes to secure the two spring arms of the male member. In another embodiment, the first end of the coupling mechanism 302 may be a slide latch and the receiver 306 may be a slide latch receiver. In still another embodiment, the first end of the coupling mechanism 302 may be a solenoid that activated a plunger, and the second end may be a notch, hole, or other receiver that secures the plunger. In yet another embodiment, the first end of the coupling mechanism 302 may be a belt or rope with a bolt snap or carabineer attached thereto, and the second end may be a loop, ring, or eye. In another embodiment, the first end of the coupling mechanism 302 may be a belt or rope and the second end may be a loop, ring, or eye, wherein the belt or rope may be tied around the second end and secured thereto. In still another embodiment, the coupling mechanism 300 may be secured to the wheelchair 204 itself, without the use of a belt receiver 306.

Further, in one embodiment, the one or more belt receivers 306 may be secured approximately between the first and second chocks 218, 220. In another embodiment, the one or more belt receivers 306 may be secured on either the first or second chock 218, 220. In another embodiment, there may be additional belt receiver 306. In this embodiment, the one or more belt receivers 306 may be secured to the first chock 218, the second chock 220, in a location partially between the first and second chocks 218, 220, to the vehicle 100 floor, to a track system in the vehicle 100, to an interior sidewall of the vehicle 100, and/or to an interior vehicle 100 ceiling. It should be appreciated that any number of belt receivers 306 may be used, and the belt receivers 306 may be located anywhere inside the vehicle 100.

The one or more belt receivers 306 may also include a sensor system. The sensor system may include one or more sensors (not pictured), one or more controllers (not pictured) and one or more transmitting devices (not pictured). The one or more sensors, one or more controllers, and one or more transmitting devices may be located within the interior 116 of the vehicle 100 or remote therefrom. In one embodiment, the one or more sensors may be inside the coupling mechanism receiver 306 or coupled to the coupling mechanism 302.

In several embodiments, the one or more sensors may be electrically coupled to a vehicle 100 controller (not shown) and the vehicle controller may be coupled to a transmitting device. In these embodiments, the sensors and vehicle controller may communicate through a wired connection. In another embodiment, the one or more sensors may be coupled to a battery and the controller may be coupled to a transmitting device. In this embodiment, the one or more sensors may communicate wirelessly with the controller, and the controller may communicate with the transmitting device.

In one embodiment, the transmitting device may provide an alert. The alert may be a sound, light, audible noise, or any other notification known in the art. In one embodiment, the notification may be delivered through the transmitting device, such that the transmitting device is providing the sound, light, noise, or other notification. In another embodiment, the transmitting device may transmit the notification to a dashboard of the vehicle 100. In another embodiment, the transmitting device may transmit the notification to a moveable device, such as a cell phone or tablet, in the vehicle 100 or remote from the vehicle 100. In another embodiment, the vehicle 100 may be a partially or completely autonomous vehicle and the transmitting device may provide the notification to the vehicle itself. The transmitting device may alert a user, a non-user, or the vehicle that the seatbelt is latched. The transmitting device may also alert a user, a non-user, or the vehicle that the coupling mechanism 300 is not fully secured within the belt receiver 306.

In one embodiment, the user 202 may position the wheelchair 204 into the one or more chocks 216, the user may transfer to the passenger seat 214, and the user may then wrap the coupling mechanism 300 around a portion of the wheelchair frame 206 or around the first and/or second rear wheels 208, 210. Upon securing the coupling mechanism 300 to the belt receiver 306, the transmitting device may provide a notification to the user, to a non-user, to the dashboard of the vehicle 100, or to a moveable device. The notification may be a sound, light, noise, or other notifications known in the art.

In another embodiment the sensor may be a proximity sensor located on one or both of the chocks 218, 220. When a wheel is within the proximity of the one or more chocks 216, the proximity sensor may send a notification. The notification may be a light, a sound, noise, or any other manner of communicating that the wheelchair 204 is in proximity of the one or more chocks. 216. This notification may be communicated to the driver of the vehicle 100, to the wheelchair user 202, to other passengers, to a moveable device, or to the vehicle 100 itself.

In one embodiment the wheelchair restraint system 200 may be installed into the vehicle 100 by installing it into the floor of the vehicle 100. In another embodiment, the wheelchair restraint system 200 may be installed onto a track system that is installed in the vehicle 100. The track system may include a first track and a second track. The first and second tracks may be installed at the factory or as an after-market part. In doing so, the tracks may be strategically positioned and mounted to the vehicle floor without requiring any drilling through the vehicle floor during installation. In another embodiment the wheelchair restraint system 200 may be installed in the vehicle 100 by securing it to the floor of the vehicle 100.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims. For instance, any of the wheelchair restraint systems, devices, concepts, and methods described herein may be used to secure a wheelchair on the platform of a wheelchair lift, such as but not limited to the lift described in U.S. patent application Ser. No. 15/608,077, filed on May 30, 2017, Ser. No. 17/154,556, filed on Jan. 21, 2021, Ser. No. 18/165,378, filed on Feb. 7, 2023, and Ser. No. 18/165,402, filed on Feb. 7, 2023, the contents of which are all incorporated by reference herein.

The invention claimed is:

1. A wheelchair restraint system for limiting movement of a wheelchair in a transport vehicle, the vehicle including an interior, a floor and a side wall, the system comprising:
   a chock comprising a body configured to contact a wheel of the wheelchair; and
   a coupling mechanism comprising at least one belt for coupling a structural component of the wheelchair to the chock.

2. The wheelchair restraint system of claim 1, wherein the at least one belt further comprises a first and a second end, the first end being coupled to the chock, the chock further comprising a receiver mechanism configured to be located in the interior of the vehicle, the second end of the belt being removably coupled to the receiver mechanism;
   wherein, when the second end is coupled to the receiver mechanism, the coupling mechanism is configured to limit movement of the wheelchair relative to the chock.

3. The wheelchair restraint system of claim 1, further comprising a sensing device located in the interior of the vehicle, the sensing device configured to detect if the coupling mechanism is coupled to the receiver mechanism.

4. The wheelchair restraint system of claim 1, further comprising a second chock including a second body configured to being coupled to the floor or side wall in the interior.

5. The wheelchair restraint system of claim 4, wherein the first end of the coupling mechanism is coupled to the first or second chock.

6. The wheelchair restraint system of claim 4, further comprising a receiver mechanism is coupled to the first or second chock.

7. The wheelchair restraint system of claim 4, wherein the first and second chocks are spaced from one another by a predefined distance.

8. A wheelchair restraint system for limiting movement of a wheelchair in a transport vehicle, the vehicle including an interior, a floor and a side wall, the system comprising:
- a chock comprising a body configured to be coupled to the floor or side wall in the interior of the vehicle; and
- a coupling mechanism comprising a first end and a second end, wherein the first end is coupled to the chock and the second end is configured to couple the wheelchair to the chock;
- wherein the body of the chock comprises a first portion and a second portion, the first portion being angled relative to the second portion.

9. The wheelchair restraint system of claim 8, wherein the first portion and second portion define internal cavities configured to receive a wheel of the wheelchair.

10. A method for restraining a wheelchair in a cab of a vehicle, the cab defined by a floor, a roof and a wall of the vehicle, the method comprising:
- providing a restraint system having at least a chock, a coupling mechanism comprising at least one belt, and a receiver mechanism;
- coupling the chock to the floor of the vehicle;
- receiving a wheel of the wheelchair within an interior cavity of the chock; and,
- attaching the coupling mechanism to a structural component of the wheelchair to limit movement of the wheelchair relative to the chock.

11. The method of claim 10, wherein the coupling the chock step comprises adjustably coupling the chock to a track system coupled to the floor of the vehicle.

12. The method of claim 10, further comprising sensing via a sensing device when the coupling mechanism is connected to the receiver mechanism.

13. The method of claim 10, further comprising:
- coupling a second chock to the floor of the vehicle;
- spacing the second chock from the first chock; and
- receiving a second wheel of the wheelchair in an interior cavity of the second chock.

14. The method of claim 13, further comprising:
- providing a second coupling mechanism and a second receiver mechanism;
- positioning the second coupling mechanism around the second wheel or the frame of the wheelchair; and
- coupling an end of the second coupling mechanism to the second receiver mechanism.

15. The method of claim 14, further comprising sensing via a sensing device when the first coupling mechanism is coupled to the first receiver mechanism or the second coupling mechanism is coupled to the second receiver mechanism.

16. The method of claim 10, further comprising:
- detecting via a sensing device when the wheel of the wheelchair is within a predefined distance of the chock; and
- transmitting a signal upon detecting the wheel is within the predefined distance of the chock.

17. A vehicle, comprising:
- an interior cab;
- a vehicle floor located in the cab;
- a track system comprising at least one track coupled to the floor; and
- a wheelchair restraint system comprising a chock, a coupling mechanism, and a receiver mechanism, the chock being adjustably coupled to the at least one track;
- wherein, the chock comprises a body defining an interior cavity configured to receive a wheel of a wheelchair;
- wherein, an end of the coupling mechanism is configured to be positioned around the wheel or a frame of the wheelchair and couple to the receiver mechanism to limit movement of a wheelchair relative to the chock.

18. The vehicle of claim 17, wherein the receiver mechanism is coupled to the chock, the vehicle floor or to another location in the cab.

19. The vehicle of claim 17, further comprising a second chock, a second coupling mechanism, and a second receiver mechanism;
- wherein, the second chock is spaced from the first chock, the second chock comprising a body having an interior cavity configured to receive a second wheel of the wheelchair.

20. The vehicle of claim 17, further comprising a sensor located in the cab of the vehicle, the sensor configured to detect when the end of the coupling mechanism is coupled to the receiver mechanism.

21. The vehicle of claim 17, wherein the chock comprises a first portion and a second portion, the first portion being integrally formed with and disposed at an angle relative to the first portion.

22. The vehicle of claim 21, wherein the first portion is adjustably coupled to the at least one track.

23. The vehicle of claim 21, wherein the interior cavity of the first portion and second portion comprises a defined width, the width being sized to receive the wheel of the wheelchair such that at least the first portion or second portion is configured to be in contact with the wheel.

24. The vehicle of claim 23, wherein when the coupling mechanism is coupled to the receiver mechanism, the coupling mechanism biases the wheel into contact with the first portion or second portion of the chock.

* * * * *